United States Patent
Kim et al.

(10) Patent No.: US 7,615,957 B2
(45) Date of Patent: Nov. 10, 2009

(54) MOBILE ROBOT CHARGE STATION RETURN SYSTEM

(75) Inventors: Sang-yun Kim, Seoul (KR); Young-gie Kim, Guri-Si (KR)

(73) Assignee: LG Electronics Inc., Seoul (KR)

( * ) Notice: Subject to any disclaimer, the term of this patent is extended or adjusted under 35 U.S.C. 154(b) by 409 days.

(21) Appl. No.: 11/553,224

(22) Filed: Oct. 26, 2006

(65) Prior Publication Data

US 2007/0096675 A1   May 3, 2007

(30) Foreign Application Priority Data

Oct. 27, 2005   (KR) ...................... 10-2005-0101793

(51) Int. Cl.
*B25J 5/00* (2006.01)
(52) U.S. Cl. .............................. 318/568.12; 318/568.16
(58) Field of Classification Search ............ 318/568.11, 318/568.12, 568.16, 626, 632
See application file for complete search history.

(56) References Cited

U.S. PATENT DOCUMENTS

| | | | |
|---|---|---|---|
| 5,446,356 A * | 8/1995 | Kim | 318/587 |
| 6,549,004 B1 * | 4/2003 | Prigge | 324/207.17 |
| 6,748,297 B2 * | 6/2004 | Song et al. | 700/259 |
| 6,764,373 B1 * | 7/2004 | Osawa et al. | 446/175 |
| 2005/0134209 A1 | 6/2005 | Kim | |

OTHER PUBLICATIONS

U.S. Appl. No. 11/553,289 to Im et al., filed Oct. 26, 2006.
U.S. Appl. No. 11/553,533 to Im et al., filed Oct. 27, 2006.

* cited by examiner

*Primary Examiner*—Rina I Duda
(74) *Attorney, Agent, or Firm*—Birch, Stewart, Kolasch & Birch, LLP (57) ABSTRACT

Disclosed is a mobile robot charge station return system, which may return a mobile robot to a charge station exactly and rapidly according to a charge station position guidance signal emitted from the charge station. The mobile robot charge station return system includes a charge station for transmitting charge station position guidance signals to different areas in such a way that different emitting distances of the charge station position guidance signals change according to a predetermined time period; and a mobile robot for receiving the charge station position guidance signals, calculating direction and distance information, and returning to the charge station according to the calculated direction and distance information.

14 Claims, 7 Drawing Sheets

MOBILE ROBOT CHARGE STATION RETURN SYSTEM

CROSS-REFERENCE TO RELATED APPLICATIONS

This application claims benefit under 35 U.S.C. §119 from Korean Patent Application No. 2005-0101793, filed on Oct. 27, 2005, the entire content of which is incorporated herein by reference.

BACKGROUND OF THE INVENTION

1. Field of the Invention

The present invention relates to a mobile robot, and more particularly, to a mobile robot charge station return system, which may return a mobile robot to a charge station exactly and rapidly according to a charge station position guidance signal emitted from the charge station.

2. Description of the Related Art

Robots have been developed for industrial purposes, which have been used for factory automatization, or for gathering or collecting information in a limited environment in which persons is unbearable, in stead of persons. Recently, such a robot-engineering field has been increasingly developed through the use in the most up-to-date space development industry, which results in development of a human-friendly home robot. The representative example of such a human-friendly home robot is a cleaning robot.

A cleaning robot, which belongs to a mobile robot, is an apparatus inhaling dust or foreign substance while traveling a certain cleaning area such as a house and an office. Such a cleaning robot includes travel means having right and left wheel motors for moving the corresponding cleaning robot, a plurality of sensors for detecting obstacles so that it can move without collision with various obstacles within a cleaning area, a controller for generally controlling the cleaning robot, etc., in addition to elements of a general vacuum cleaner inhaling dust or foreign substance.

On the other hand, a mobile robot has an automatic charge function because it carries out its own duties while moving a predetermined area. That is, the mobile robot automatically returns to a chare station installed in a predetermined position within the area and charges its own battery when it checks the battery level by itself and the battery level does not reach a reference value. After charging the battery, the mobile robot carries out its own duties again.

According to the prior art, in order to cause the mobile robot to automatically return to a chare station, a method has been used, which randomly moving the mobile robot along the wall surface of the area, and causing the mobile robot to return to the chare station when an artificial mark attached to the chare station is detected.

However, since such a method randomly moves the mobile robot along a wall surface, time required for returning to a chare station changes depending on areas in which the mobile robot is located. Further, according to this method, when the artificial mark attached to the chare station is detected late, the operation of the mobile robot may be stopped due to the consumption of the battery thereof.

According to another method for automatically causing a mobile robot to return to a chare station, signal emission means for emitting infrared rays or supersonic waves is installed in the chare station, and the mobile robot is allowed to return to the chare station when the infrared rays or supersonic waves emitted from the signal emission means are detected.

However, the conventional mobile robot can calculate only direction information of a charge station but cannot calculate distance information to the charge station from a signal emitted from the charge station. Accordingly, it is difficult to modify a charge station return path until the mobile robot mechanically or electrically contacts with the charge station.

SUMMARY OF THE INVENTION

Accordingly, it is an object of the present invention to provide a mobile robot charge station return system, which may effectively return a mobile robot to a charge station by calculating direction information and position information of a charge station from charge station position guidance signals.

In accordance with the present invention, there is provided mobile robot charge station return system comprising: a charge station for transmitting charge station position guidance signals to different areas in such a way that different emitting distances of the charge station position guidance signals change according to a predetermined time period; and a mobile robot for receiving the charge station position guidance signals, calculating direction and distance information, and returning to the charge station according to the calculated direction and distance information.

The mobile robot charge station return system of the present invention transmits charge station position guidance signals to different areas in such a way that different emitting distances of the charge station position guidance signals change according to a predetermined time period. This causes an exact distance and direction between the charge station and the mobile robot to be calculated from the charge station position guidance signals that allows the mobile robot to be returned to the mobile robot within a shorter time.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

The present invention now will be described more fully hereinafter with reference to the accompanying drawings, in which embodiments of the invention are shown.

Figure 1:
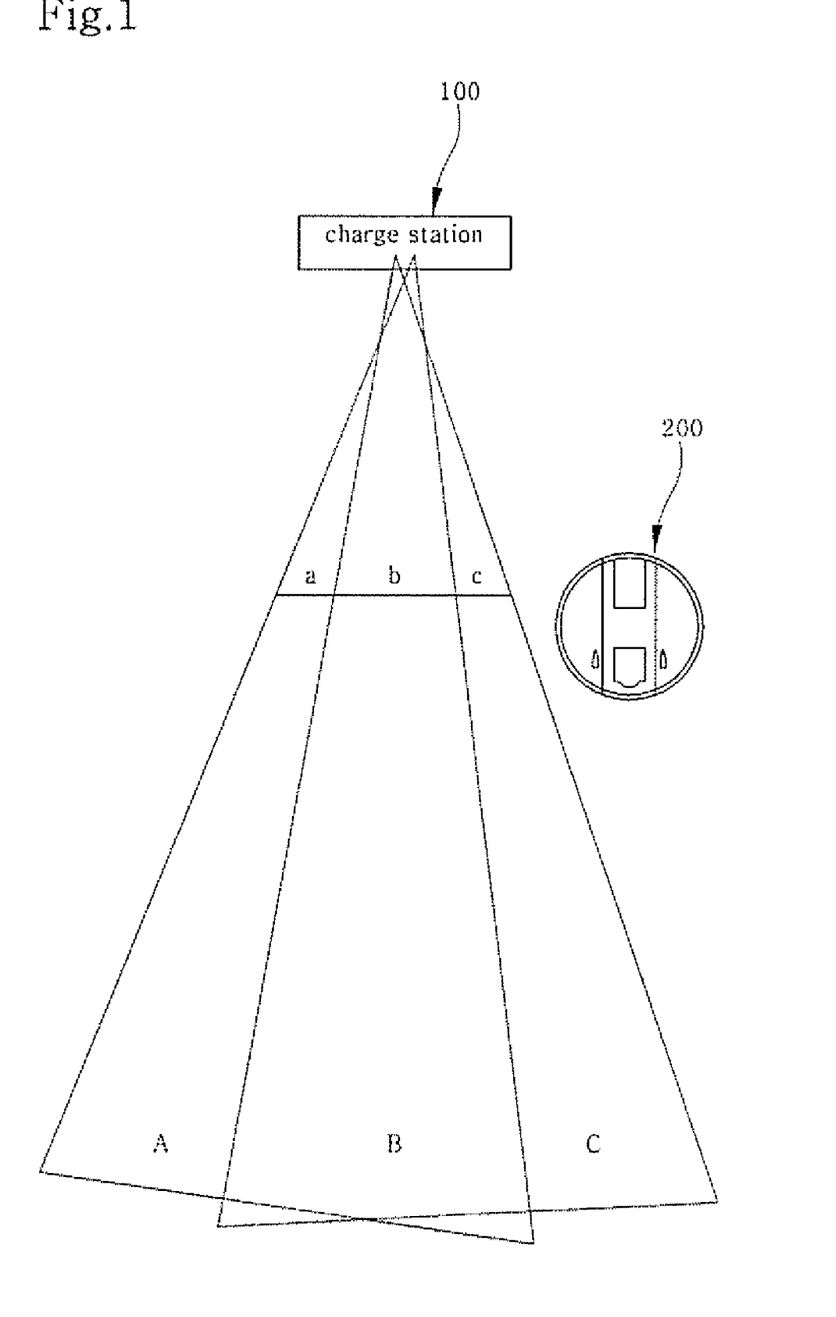
FIG. 1 is a view schematically showing a mobile robot charge station return system according to the present invention.

FIG. 1 is a view schematically showing a mobile robot charge station return system according to the present invention. As shown, the mobile robot charge station return system according to the present invention includes a charge station 100 and a mobile robot 200. The charge station 100 transmits charge station position guidance signals to different areas in such a way that different transmitting distances of the charge station position guidance signals change according to a predetermined time period. The mobile robot 200 receives charge station position guidance signal, calculates direct and distance information of the charge station, and returns to the charge station 100 according to the calculated direct and distance information of the charge station.

The charge station 100 supplies power necessary to drive the mobile robot 200 to charge the battery of the mobile robot 200. That is, if the mobile robot 200 detects the battery level while carrying out its duties and determines that it is necessary to charge the battery thereof, the mobile robot 200 returns to the charge station 100 according to a charge station return algorithm using the received charge station position guide signals. If the mobile robot 200 is docked according to a charge station return algorithm, the charge station 100 supplies power to charge the battery of the mobile robot 200. If the charge is completed, the mobile robot 200 leaves the charge station 100 and carries out its own duties again.

Figure 2:
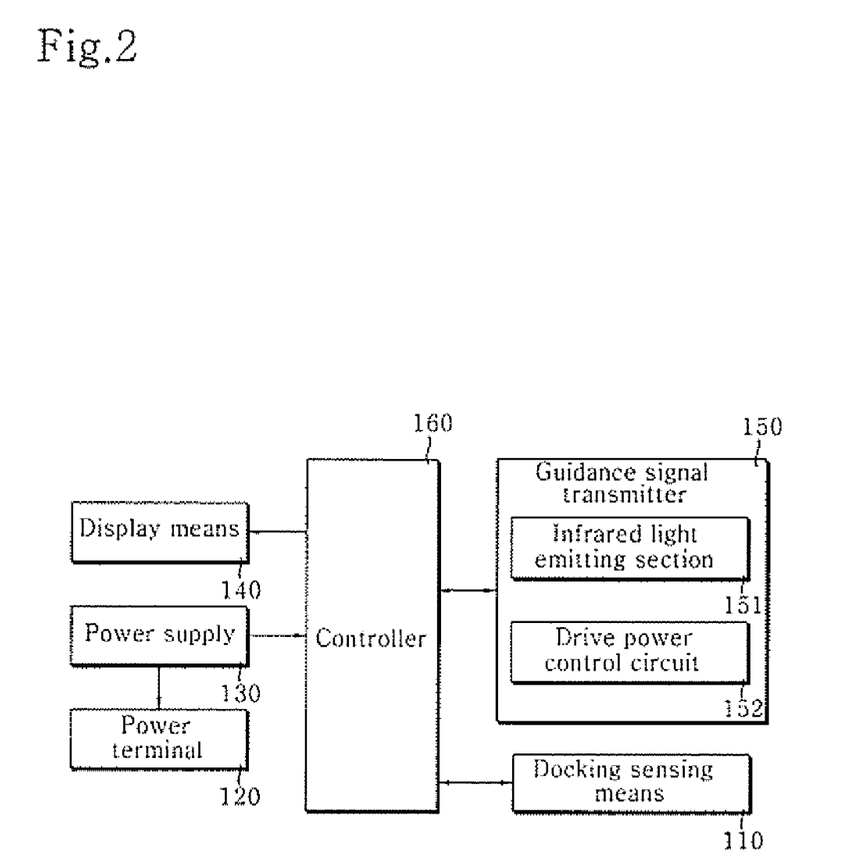
FIG. 2 is a block diagram schematically showing a construction of the charge station shown in FIG. 1.

A construction of the charge station 100 will be described with reference to FIG. 2 in detail. FIG. 2 is a block diagram schematically showing a construction of the charge station shown in FIG. 1. As shown, the charge station 100 includes a docking sensing means 110, a power terminal 120, a power supply 130, and a display means 140. The docking sensing means 110 senses a docking or non-docking of the mobile robot 200. The power terminal 120 charges a battery of the docked mobile robot 200. The power supply 130 converts and supplies a common alternating current power into a direct current voltage, which is necessary to drive the charge station 100 and to charge a battery of the mobile robot 200. The display means 140 displays a charged state of the mobile robot 100. Since a basic construction of the charge station 100 is known in the art, a detailed description is omitted.

The charge station 100 is installed at a predetermined position of an area that the mobile robot 200 carries out its own duties. The charge station 100 further includes a guidance signal transmitter 150 and a controller 160 besides a basic construction of the charge station 100. The guidance signal transmitter 150 includes a plurality of infrared light emitting sections 151 and a drive power control circuit 152. The plurality of infrared light emitting sections 151 are formed at a front of the charge station 100 to be spaced apart from each other, and transmit charge station position guidance signals to different areas in such a manner that different transmitting distances of the charge station position guidance signals change according to an amplitude of a drive power. The drive power control circuit 152 adjusts the amplitude of a drive power applied to the infrared light emitting sections 151. The controller 160 controls a total operation of the charge station 100, and outputs a control signal to control the amplitude of a drive power with a predetermined period.

For example, each of the infrared light emitting sections 151 can be embodied by an infrared light emitting diode. Each infrared light emitting section 151 outputs charge station position guidance signals having different transmitting distances according to the amplitude of an electric current applied to a drive power control circuit 152, which is selectively connected by the controller 160.

The drive power control circuit 152 is electrically connected to the infrared light emitting sections 151. The drive power control circuit 152 adjusts an electric current of a drive power applied from the power supply 130 according to the control signal of the controller 160, and applies the adjusted electric current thereof to the infrared light emitting sections 151.

Figure 3A:
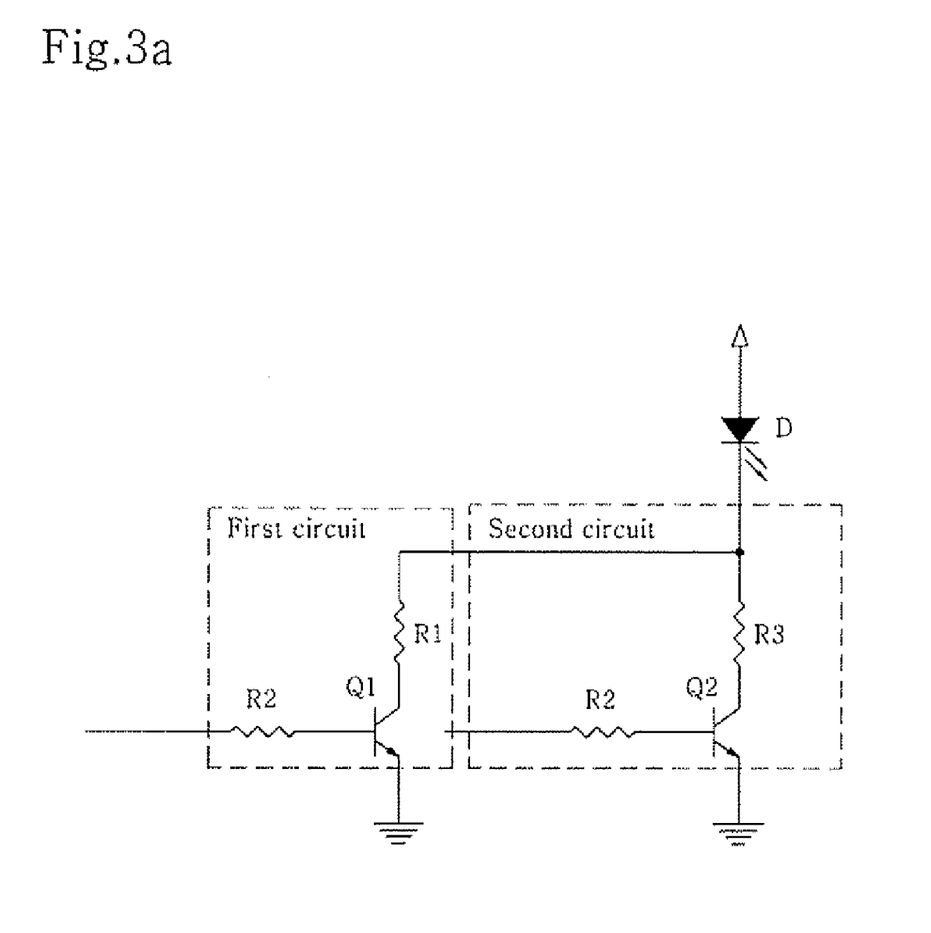
FIGS. 3a and 3b are circuitry diagrams schematically showing a drive power control circuit shown in FIG. 2.
Figure 3B:
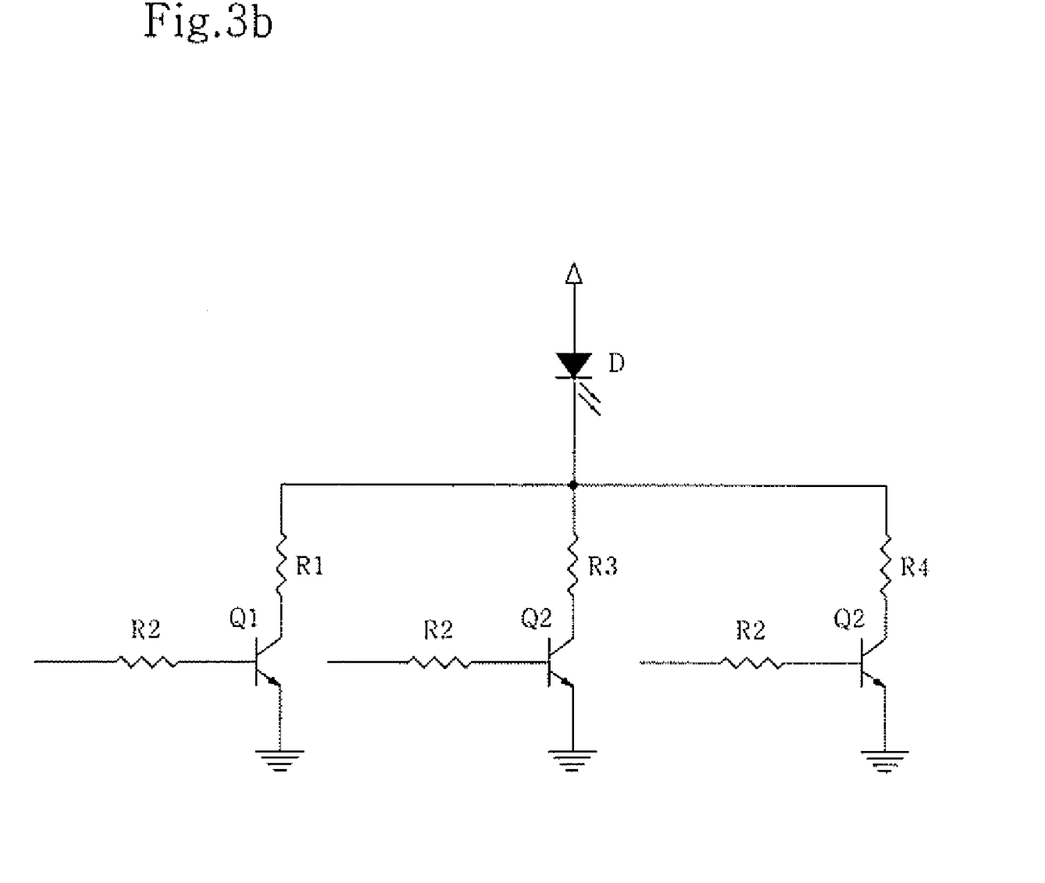

The following is a detailed description of the drive power control circuit 152 by reference to FIGS. 3a and 3b. FIGS. 3a and 3b are circuitry diagrams schematically showing a drive power control circuit shown in FIG. 2. FIG. 3a shows a drive power control circuit of a charge station having a transmitting distance of two stages. FIG. 3b shows a drive power control circuit of a charge station having a transmitting distance of three stages.

As shown, the drive power control circuit 152 includes an infrared light emitting diode D, first resistors $R_1$, $R_3$, $R_4$, second resistor $R_2$, and a transistor $Q_1$, $Q_2$, or $Q_3$. The infrared light emitting diode D is connected to the power supply 130 in a forward direction. The first resistors $R_1$, $R_3$, $R_4$, are connected to one terminal of the infrared light emitting diode D. One terminal of the second resistors $R_2$ is connected to an output terminal of the controller 160. A collector of the transistor $Q_1$, $Q_2$, or $Q_3$ is connected to another terminal of the first resistor $R_1$, $R_3$, or $R_4$, an emitter thereof is connected to a ground, and a base thereof is connected to another terminal of the second resistor $R_2$.

At least two drive power control circuits 152 are connected to one infrared light emitting diode D in parallel. The second resistors $R_2$ connected to bases of the transistors $Q_1$, $Q_2$, $Q_3$ have the same resistance, and are connected to a terminal such as a GPIO of the controller 160.

On the other hand, the first resistors $R_1$, $R_3$, $R_4$ connected to collectors of the transistors $Q_1$, $Q_2$, $Q_3$ have different resistances. The first resistors R1, R3, R4 included in respective circuits, determine the amplitude of an electric current flowing through the drive power control circuit 152. The smaller a resistance of the first resistor is, the greater an electric current flows to the infrared light emitting diode D.

An operation of the drive power control circuit 152 will be explained with reference to FIG. 3a. The controller 160 outputs a control signal to drive the transistor $Q_1$, $Q_2$, every predetermined time period through GPIO terminals connected to a first drive power control circuit and a second drive power control circuit.

For example, when the controller 160 outputs a control signal to a GPIO terminal connected to the first drive power control circuit, a first transistor $Q_1$ of the first drive power control circuit is driven, and an electric current supplied from the power supply 130 is introduced into the infrared light emitting diode D, a first resistor $R_1$, and the first transistor $Q_1$.

Moreover, when the controller 160 outputs a control signal to a GPIO terminal connected to the second drive power control circuit, a second transistor $Q_2$ of the second drive power control circuit is driven, and an electric current supplied from the power supply 130 is introduced into the infrared light emitting diode D, a third resistor $R_3$, and the second transistor $Q_2$.

The first and third resistors $R_1$ and $R_3$ connected to the first and second drive power controllers determines the amplitudes of electric currents flowing through the plurality of drive power control circuits 152. The smaller the resistance is, the greater the electric current flows to the infrared light emitting diode D. For example, a resistance of the first resistor $R_1$ in the first drive power control circuit is 10Ω, and a resistance of the third resistor $R_3$ in the second drive power control circuit is 20Ω. When a predetermined voltage VCC from the power supply 130 is applied to the drive power control circuits 152, an amount of an electric current flowing through the first drive power control circuit is 1 A, and an amount of an electric current flowing through the second drive power control circuit is 0.5 A.

A transmitting distance of a guidance signal transmitted through the infrared light emitting diode D is proportioned to an amount of the electric current flowing thereto. Accordingly, a case of supplying a power through the first drive power control circuit is shorter in the transmitting distance as compared with a case of supplying a power through the second drive power control circuit. Further, the guidance signal transmitter 150 may transmit guidance signals having a transmitting distance of two stages.

As shown in FIG. 3b, by connecting the drive power control circuits 152 to each in parallel, the guidance signal transmitter 150 can transmit charge station position guidance signals of transmitting distance having a wide variety.

For example, the controller 160 may include a microprocessor, a memory, and a micro controller. The microprocessor serves operations. The memory stores operation results and an operating program for driving the charge station 100. The micro controller includes circuits such as a pulse generator for providing clock pulses to drive the microprocessor, which is embodied in one chip. The controller 160 having a construction mentioned above sequentially output a control signal to the drive power control circuit with predetermined time periods.

Figure 4:
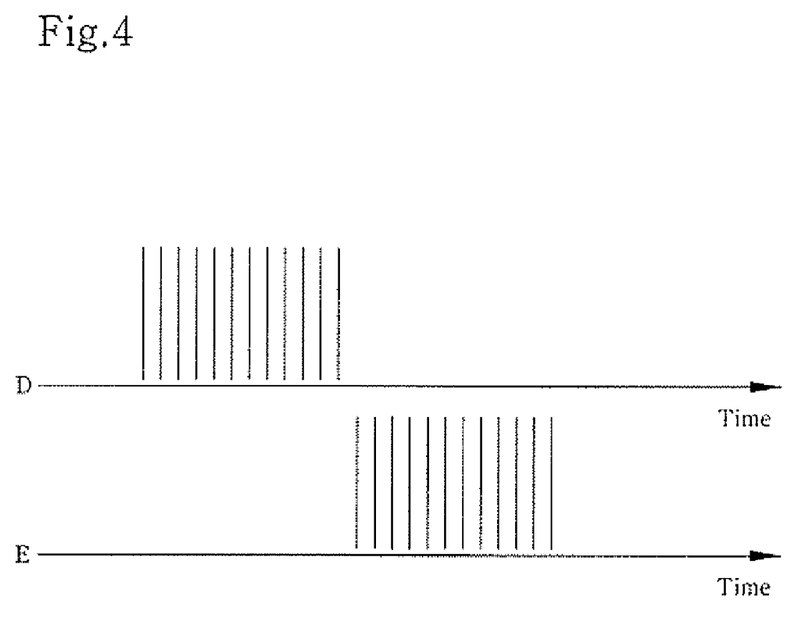
FIG. 4 is timing chart of the charge station position guidance signal by emitting distances, which is transmitted by the guidance signal transmitter.

The timing of the charge station position guidance signal by emitting distances, which is outputted from the infrared light emitting section 151 under a control of the controller 160 is shown in FIG. 4. FIG. 4 is timing chart of the charge station position guidance signals by emitting distances, which is transmitted by the guidance signal transmitter.

As shown, the guidance signal transmitter 150 outputs charge station position guidance signals having different transmitting distances according to a control signal of the controller 160. The mobile robot 200 receives the charge station position guidance signals from the guidance signal transmitter 150, and calculates a direction and a distance of the charge station 100. Namely, in FIG. 4, D represents a signal to transmit a near distance signal having a shorter transmitting distance, E represents a signal to transmit a long-distance signal having a longer transmitting distance.

The mobile robot 200 performs its duty while moving to a defined zone according to a mounted program. There is a cleaning robot 200 as a typical example of a common mobile robot. The cleaning robot 200 is a mobile robot 200, which freely travels a fixed zone to suck dust or dirt.

The mobile robot 200 will be now be described by referring to FIG. 4, based on the cleaning robot 200 being an example of the mobile robot 200.

Figure 5:
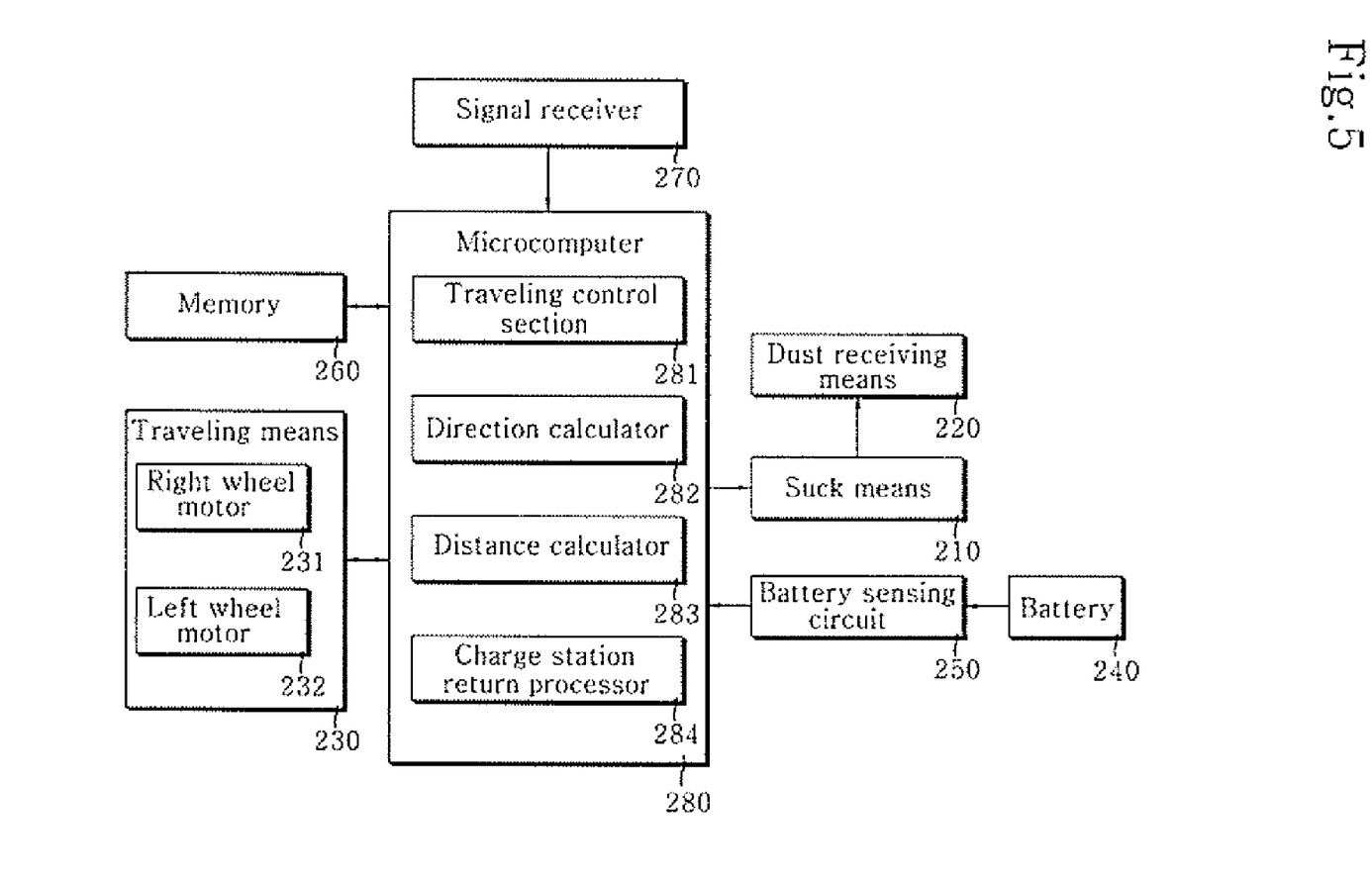
FIG. 5 is a block diagram schematically showing a configuration of a cleaning robot, which is a mobile robot shown in FIG. 1.

FIG. 5 is a block diagram schematically showing a configuration of a cleaning robot, which is a mobile robot shown in FIG. 1. The cleaning robot 200 include a dust sensor (not shown), a sucking means 210, a dust receiving means 220, a traveling means 230, a battery 240, a battery sensing circuit 250, and a memory 260. The dust sensor senses dust or dirt in a cleaning zone. The sucking means 210 sucks and collects the dust or dirt sensed by the dust sensor. The receiving means 220 receives the dust or dirt sucked and collected by the sucking means 210. The traveling means 230 travels the cleaning robot 200. The battery 240 supplies a drive power to the sucking means 210 and the traveling means 230. The battery sensing circuit 250 senses a residual amount of the battery 240 every predetermined time period and outputs a battery charge request signal when the residual amount of the battery 240 is equal to or less than a reference value. The memory 260 stores a drive program of the cleaning robot 200, and direction and distance information of the charge station 100 calculated from the charge station position guidance signals.

The cleaning robot 200 includes a signal receiver 270 and a microcomputer. The signal receiver 270 receives the charge station position guidance signals outputted from the guidance signal transmitter 150. The microcomputer controls a total operation of the cleaning robot 200, calculates direction and distance information of the charge station 100 using the charge station position guidance signals from the signal receiver 270, and outputs a control signal to a traveling means 230 to return the cleaning robot 100 to the charge station 100.

Among the construction of the cleaning robot 200, the sucking means 210, the dust receiving means 220, the battery 204, and the battery sensing circuit 250 are well known in the art, a detailed explanation thereof is omitted. For example, the memory 260 may be constructed by a non-volatile memory device such as EEPROM or flash memory, and stores an operating program for driving the cleaning robot. Further, the memory 260 stores direction and position information of the charging section 100 calculated using the charging section position guide signal emitted from the charging section 100. The microcomputer accesses the operating program and the position information of the charging station 100.

For example, the signal receiver 270 can be embodied by an infrared light receiving section, which receives charge station position guidance signals such as an infrared light signal transmitted from the charge station 100, and outputs the received charge station position guidance signals to the controller 160.

The traveling means 230 drives right and left wheel motors 231 and 232 to travel the cleaning robot 200 according to a control signal outputted from the microcomputer. The right and left wheel motors 231 and 232 of the traveling means 230 are connected to right and left wheels to travel the cleaning robot 200. Accordingly, the cleaning robot 200 travels front and back, and right and left according to rotating speed and direction of the right and left wheel motors 231 and 232.

The microcomputer includes a traveling control section 281, a direction calculator 282, a distance calculator 283, and a charge station return processor 284. The traveling control section 281 controls a total operation of the cleaning robot 200. The direction calculator 282 calculates direction information of the charge station 100 based on the charge station position guidance signals outputted from the signal receiver 270. The distance calculator 283 calculates distance information between the cleaning robot 200 and the charge station 100 based on the charge station position guidance signals having different transmitting distances. The charge station return processor 284 outputs a control signal to the traveling control section 281 using the direction and distance information of the charge station 100 so that the cleaning robot 200 returns to the charge station 100.

The traveling control section 281 controls the traveling means 230 according to a control command of the operating program in the cleaning robot 200.

The direction calculator 282 analyzes frequencies of the charging section position signals received by the signal receiver 270, judges which direction the cleaning robot 200 positions round the charging section 100 based on the analyzed result, and outputs the judgment result to the charging station return processor 284.

As mentioned above, the charging section 100 includes a plurality of infrared light emitting sections, which transmit the charge station position guidance signals having different frequencies to respective areas. For example, as shown in FIG. 1, an infrared light having a frequency of 400 Hz is emitted to a right area round the charging section 100, an infrared light having a frequency of 300 Hz is emitted to a left area round the charging section 100, and the two infrared lights are emitted to a center area of the charging section 100 to overlap with each other.

The direction calculator 282 analyzes frequencies of the charging section position signals received by the signal receiver 270, judges which direction the cleaning robot 200 positions round the charging section 100 based on the analyzed result, and outputs the judgment result to the charging station return processor 284.

That is, when the direction calculator 282 receives an infrared light signal having a frequency of 400 Hz, it informs the charging station return processor 284 that the cleaning robot 200 is currently positioned at a right area round the charging station 100.

Further, when the direction calculator 282 receives an infrared light signal having a frequency of 300 Hz, it informs the charging station return processor 284 that the cleaning robot 200 is currently positioned at a left area round the charging station 100.

On the other hand, the distance calculator 283 calculates a distance between the cleaning robot 200 and the charge station 100 based on a plurality of charge station position guidance signals having different emitting distances according to a predetermined time period, which are transmitted from the guidance signal transmitter 150.

As described above, respective infrared light emitting sections 151 included in the charge station 100 outputs the charge station position guide signals to different transmitting distances, which are infrared light signals having predetermined frequency according to the amplitude of an applied drive power. For example, the infrared light emitting sections 151 repeat to transmit the charge station position guidance signals having different transmitting distances with a predetermined time period in such a way that they output a first charge station position guidance signal to a transmitting distance of 1M during a first time period and a second charge station position guidance signal to a transmitting distance of 2M during a second time period.

Accordingly, the distance calculator 283 calculates a distance between the cleaning robot 200 and the charge station 100 based on reception or non-reception of the first and second charge station position guidance signals, and outputs the calculated result to the charge station return processor 284.

Figure 6:
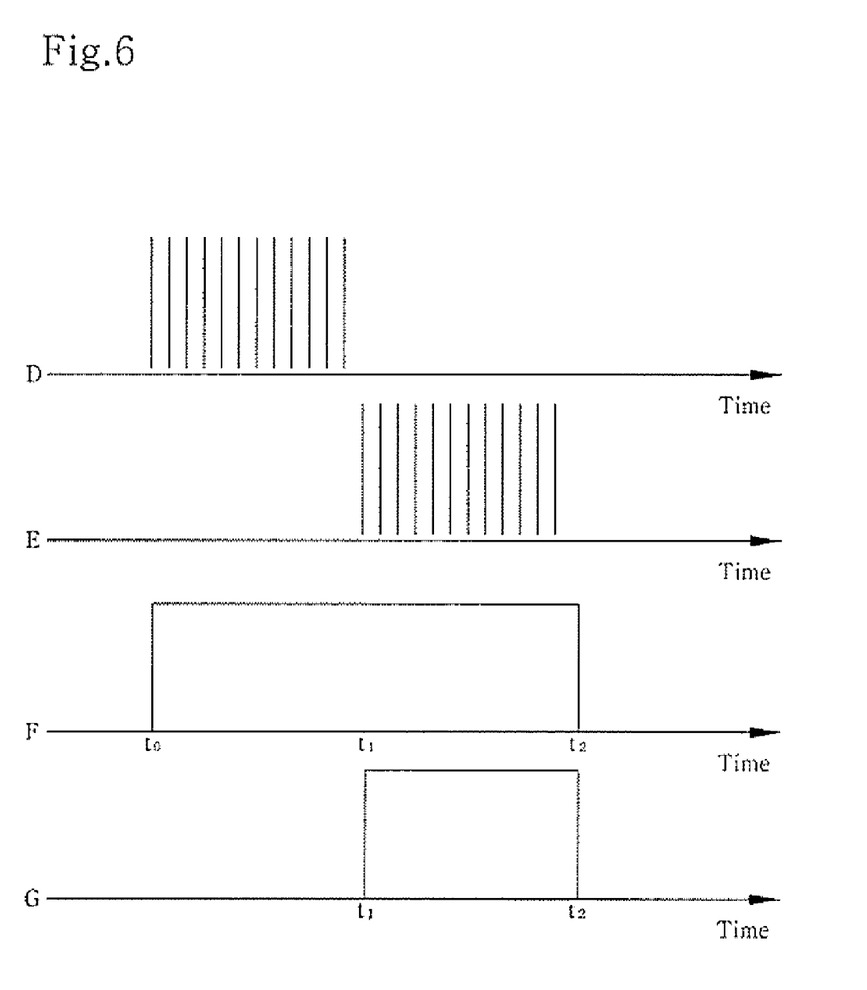
FIG. 6 is a timing chart illustrating a procedure for calculating distance information between the mobile robot and the charge station by a distance calculator shown in FIG. 5.

A procedure of calculating distance information by the distance calculator 283 will be described with reference to FIG. 6. FIG. 6 is a timing chart illustrating a procedure for calculating distance information between the mobile robot and the charge station by a distance calculator shown in FIG. 5. As shown, the charge station 100 outputs the charge station position guidance signals at predetermined time intervals. Namely, in FIG. 6, D represents a transmitting timing of a charge station position guidance signal having a near transmitting distance, and E represents a transmitting timing of a charge station position guidance signal having a longer transmitting distance.

When the signal receiver 270 of the cleaning robot 200 receives the charge station position guidance signals from the charge station 100, it outputs a signal F or a signal G corresponding to the reception time of the charge station position guidance signals to the distance calculator 283.

For example, when a signal is received during a time period from the time t0 to the time t1, and the charge station position guidance signal (signal F) is followed without delay during a time period from the time t1 to the time t2, that is, when both of a transmitting signal of near distance and a transmitting signal of longer distance are received, the distance calculator 283 informs the charge station return processor 284 that the cleaning robot 200 is positioned at a zone (zone a, b, or c of FIG. 1) capable of docking with the charge station 100.

On the other hand, when the signal is not received during a time period from the time t0 to the time t1, but the charge station position guidance signal is received during a time period from the time t1 to the time t2, namely, when only a transmitting signal of longer distance (signal G) is received, the distance calculator 283 informs the charge station return processor 284 that the cleaning robot 200 is positioned at a zone (zone A, B, or C of FIG. 1) away from the charge station 100.

In other words, when both of near and longer distance guidance signals are received, the distance calculator 283 judges that the cleaning robot 200 is positioned at a zone capable of docking with the charge station 100. In contrast to this, when only one of near and longer distance guidance signals are received, the distance calculator 283 judges that the cleaning robot 200 is positioned at a zone away from the charge station 100.

The charge station return processor 284 outputs a control signal to drive the signal receiver 270 in response to a battery charge request outputted from the battery sensing circuit 250. Further, the charge station return processor 284 receives and stores direction and distance information outputted from the direction calculator 282 and the distance calculator 283 in the memory 260. In addition, the charge station return processor 284 outputs a control signal to the traveling control section 281 to travel the cleaning robot 200 to a corresponding direction.

When the cleaning robot 200 is positioned at a zone capable of docking with the charge station 100, the charge station return processor 284 outputs a control signal to the traveling control section 281 according to a docking algorithm of an operating program stored in the memory 269 so that the cleaning robot 200 returns to the chare station 100. Because the aforementioned docking algorithm is well known, a detailed description thereof is omitted.

The following is a description of a procedure of returning the mobile robot to the charge station according to the present invention. When a user inputs a drive command in the mobile robot 200, the mobile robot 200 travels a fixed zone and performs its duty according to an operating program.

The battery sensing circuit 250 tests a power of a battery every time period while performing its duty, and outputs a battery charge request signal to the charge state return processor 284 when a residual amount of the battery is less than or equal to a predetermined reference value.

The charge station return processor 284 outputs a control signal to drive the signal receiver 270 according to a battery charge request, and the signal receiver 270 receives a charge station position guidance signal from the charge station 100. When the charge station position guidance signal is not received, the charge station return processor 284 outputs a control signal to the traveling control section 281 to move the mobile robot 200 to a zone capable of receiving the charge station position guidance signals, thereby randomly traveling the mobile robot 200 according to a predetermined traveling algorithm.

When the signal receiver 270 receives the charge station position guidance signals, it outputs the charge station position guidance signals to the direction calculator 282 and the distance calculator 283. The direction calculator 282 analyzes frequencies of the charging section position signals received by the signal receiver 270, judges which direction the cleaning robot 200 positions round the charging section 100 based on the analyzed result, and outputs the judgment result to the charging station return processor 284.

Further, when both of near and longer distance guidance signals are received, the distance calculator 283 judges that the cleaning robot 200 is positioned at a zone capable of docking with the charge station 100. In contrast to this, when only one of near and longer distance guidance signals are received, the distance calculator 283 judges that the cleaning robot 200 is positioned at a zone away from the charge station 100 and outputs the judged result to the charge station return processor 284.

The charge station return processor 284 receives and stores direction and distance information outputted from the direction calculator 282 and the distance calculator 283 in the memory 260. In addition, the charge station return processor 284 outputs a control signal to the traveling control section 281 to travel the cleaning robot 200 to a corresponding direction.

In addition, when the mobile robot 200 is positioned at a zone capable of docking with the charge station 100, the charge station return processor 284 outputs a control signal to the traveling control section 281 so that the mobile robot 200 docks with the charge station 100 according to a docking algorithm of an operating program stored in the memory 260.

As is seen from the forgoing description, the mobile robot charge station return system of the present invention transmits charge station position guidance signals to different areas in such a way that different emitting distances of the charge station position guidance signals change according to a predetermined time period. This causes an exact distance and direction between the charge station and the mobile robot to be calculated from the charge station position guidance signals that allows the mobile robot to be returned to the mobile robot within a shorter time.

In addition, since only a circuit using resistors and transistors adjusts the amplitude of a power to control a transmitting distance of a charge station position guide signal, a single circuit arrangement can effectively return the mobile robot to the charge station.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A mobile robot charge station return system comprising:
   a charge station for transmitting charge station position guidance signals to different areas in such a way that different emitting distances of the charge station position guidance signals change according to a predetermined time period; and
   a mobile robot for receiving the charge station position guidance signals, calculating direction and distance information, and returning to the charge station according to the calculated direction and distance information,
   wherein the charge station includes:
   a guidance signal transmitter including a plurality of infrared light emitting sections formed at a front of the charge station for transmitting the charge station position guidance signals to different areas, and a drive power control circuit for adjusting an amplitude of a drive power applied to the infrared light emitting sections; and
   a controller for outputting a control signal to control the amplitude of the drive power with a predetermined period, and
   wherein the drive power control circuit includes:
   first resistors connected to one terminal of the infrared light emitting sections, which is connected to a power supply in a forward direction;
   second resistors having one terminal connected to an output terminal of the controller; and
   a transistor having a collector, an emitter and a base, the collector connected to another terminal of the first resistor, the emitter connected to a ground, and the base connected to another terminal of the second resistor.

2. The mobile robot charge station return system as claimed in claim 1, wherein at least two drive power control circuits are connected to the infrared light emitting section, and the first resistors connected to the infrared light emitting section having different resistances.

3. The mobile robot charge station return system as claimed in claim 2, wherein the smaller a resistance of the first resistor is, the farther the charge station position guide signal is transmitted.

4. The mobile robot charge station return system as claimed in claim 1, wherein the mobile robot includes:
   a traveling means for traveling the mobile robot;
   a signal receiver for receiving the charge station position guidance signals outputted from the charge station; and
   a microcomputer for calculating direction and distance information of the charge station using the charge station position guidance signals from the signal receiver, and for outputting a control signal to a traveling means to return the mobile robot to the charge station.

5. The mobile robot charge station return system as claimed in claim 4, wherein the microcomputer includes:
   a traveling control section for controlling a drive of the traveling means;
   a direction calculator for calculating direction information of the charge station based on the charge station position guidance signals outputted from the signal receiver; a distance calculator for calculating distance information between the mobile robot and the charge station based on the charge station position guidance signals;
   a charge station return processor for outputting a control signal to the traveling control section using the direction and distance information of the charge station so that the mobile robot returns to the charge station.

6. The mobile robot charge station return system as claimed in claim 5, wherein the direction calculator analyzes frequencies of the charging section position signals received by the signal receiver and judges the position of the cleaning robot relative to the charging section based on the analyzed result.

7. The mobile robot charge station return system as claimed in claim 5, wherein the distance calculator calculates a distance between the mobile robot and the charge station according to reception or non-reception of the charge station position guidance signals having different emitting distances.

8. The mobile robot charge station return system as claimed in claim 5, wherein the charge station return processor outputs a control signal to drive a signal receiver for receiving the charge station position guidance signals according to a battery charge request.

9. The mobile robot charge station return system as claimed in claim 1, wherein the mobile robot is a cleaning robot.

10. A mobile robot charge station return system comprising:
    a charge station for outputting charge station position guidance signals having different transmitting distances by adjusting an amplitude of a drive power applied to a plurality of infrared light emitting sections for transmitting charge station position guidance signals having different frequencies; and a mobile robot for calculating direction information of the charge station using the frequencies of the charge station position guidance signals, calculating distance information with the charge station according to reception or non-reception of the charge station position guidance signals having different transmitting distances, and returning to the charge station according to the calculated direction and distance information, wherein the charge station includes:

a drive power control circuit for controlling an amplitude of a drive power applied to the infrared light emitting sections, the drive power control circuit including:

first resistors connected to one terminal of the infrared light emitting sections, which is connected to a power supply in a forward direction;

second resistors having one terminal connected to an output terminal of the controller; and a transistor having a collector, an emitter and a base, the collector connected to another terminal of the first resistor, the emitter connected to a ground, and the base connected to another terminal of the second resistor.

11. The mobile robot charge station return system as claimed in claim 10, wherein at least two drive power control circuits are connected to the infrared light emitting section, and the first resistors connected to the infrared light emitting section having different resistances.

12. The mobile robot charge station return system as claimed in claim 11, wherein the smaller a resistance of the first resistor is, the farther the charge station position guide signal is transmitted.

13. The mobile robot charge station return system as claimed in claim 10, wherein the mobile robot receives the charge station position guidance signals and calculates direction and distance information of the charge station.

14. The mobile robot charge station return system as claimed in claim 10, wherein the mobile robot is a cleaning robot.

* * * * *